United States Patent [19]

Topol

[11] 3,719,609

[45] March 6, 1973

[54] SYNTHESIS OF IONICALLY CONDUCTIVE COMPOSITIONS OF MATTER

[75] Inventor: Leo E. Topol, Canoga Park, Calif.

[73] Assignee: North American Rockwell Corporation, El Segundo, Calif.

[22] Filed: Dec. 8, 1970

[21] Appl. No.: 96,227

[52] U.S. Cl. ................................252/518, 423/463
[51] Int. Cl. .................................................H01b 1/02
[58] Field of Search .............252/518; 23/87, 89, 367

[56] References Cited

UNITED STATES PATENTS

| | | | |
|---|---|---|---|
| 3,519,404 | 7/1970 | Argue et al. | 252/518 |
| 2,944,975 | 7/1960 | Follerth | 23/204 |

OTHER PUBLICATIONS

Jacobson, Encyclopedia of Chemical Reactions, Vol. VI, 1956, p. 162.

Primary Examiner—George F. Lesmes
Assistant Examiner—J. P. Brammer
Attorney—L. Lee Humphries, Thomas S. MacDonald and Henry Kolin

[57] ABSTRACT

A process for the preparation of a solid ionically conductive composition of matter of either the formula:

1. $MAg_4I_5$ in which M is Rb, $NH_4$, K, Cs, or a combination of these, Cs being present only as a minor constituent of M; or 2. $QAg_nI_{n+1}$ where $n$ has a value from 3 to 39 inclusive and Q is an organic ammonium cation having an ionic volume between 30 and 85 cubic angstroms; comprising reacting approximately stoichiometric quantities, corresponding to the ionically conductive composition formed, of AgI and either MI or QI in a solution of NaI or LiI, the solvent for the NaI or LiI being water or a selected polar organic solvent, preferably acetonitrile or dimethyl formamide.

12 Claims, No Drawings

SYNTHESIS OF IONICALLY CONDUCTIVE COMPOSITIONS OF MATTER

BACKGROUND OF THE INVENTION

This invention relates to a process for the preparation of solid ionically conductive compositions of matter having unusually high ionic conductivity. It particularly relates to a process for the preparation of compounds having the formula (1) $MAg_4I_5$ in which M is Rb, $NH_4$, K, Cs, or a combination of these, Cs being present only as a minor constituent of M; and (2) $QAg_nI_{n+1}$, where $n$ has a value from 3 to 39 inclusive and Q is an organic ammonium cation having an ionic volume between 30 and 85 cubic angstroms. Such compositions are particularly useful as electrolytes in solid state electric cells. Electric cells containing these electrolyte materials are described in U. S. Pat. Nos. 3,433,997 and 3,476,606, respectively.

Compositions of the foregoing type, $MAg_4I_5$ and $QAg_nI_{n+1}$ have recently been shown to have high ionic conductivity in the solid state over a wide range of temperatures. The known methods of preparing these compositions involve mixing appropriate amounts of the solid reactants MI and AgI or QI and AgI in the desired molar ratios, and either heating the mixture until molten, followed by a holding period at a lower temperature to form the desired compound (melt-anneal technique), or reacting the solid reactants in a time-consuming solid-state reaction at an annealing temperature of 200°C or higher to form the compound. In an alternative method of preparation of $MAg_4I_5$, the constituents are dissolved in acetone and precipitated by evaporation. However, this method results in a mixture of the desired compound and another compound, generally of high resistivity, rather than the pure ionically conductive composition. For preparing the organic silver ammonium iodide conductive compositions, $QAg_nI_{n+1}$, a paste preparation technique has also been used in which a slurry or paste is prepared of the silver iodide and the organic ammonium iodide, followed by a multiple annealing technique. Synthesis in an aqueous medium in which the silver iodide and organic ammonium iodide reactants and the formed product exhibit only a limited solubility has also been suggested as feasible.

The present invention provides a simple and convenient method for the preparation of solid ionically conductive materials from selected solutions. The process of this invention is advantageous compared with the methods known to the prior art in that it is more easily adapted to large-scale production, provides for control or variation of the composition of the materials formed, and may be used to produce large crystals or thin films of the desired compound. The present process does not require the use of a high temperature, and the synthesized compositions may be easily recovered from the reaction medium.

The compositions prepared by the process of this invention have a high ionic conductivity and may be used in a variety of electrochemical devices. The process is of particular utility for preparing compositions for use in thin-film and single-crystal devices.

SUMMARY OF THE INVENTION

The solid ionically conductive compositions which may be prepared by the process of this invention have either the general formula:

1. $MAg_4I_5$ in which M is Rb, K, $NH_4$, Cs, or combinations thereof, Cs being present only as a minor constituent of M; or
2. $QAg_nI_{n+1}$ where n has a value from 3 to 39 inclusive and Q is an organic ammonium cation having an ionic volume between 30 and 85 cubic angstroms.

According to the process of this invention, AgI and a compound MI or QI (M and Q as above defined) are reacted in approximately stoichiometric amounts, corresponding to the ratios of the compositions formed, in a liquid reaction medium which is a solution of sodium iodide, lithium iodide, or an alkaline earth iodide, e.g., barium iodide or strontium iodide. The solvent for the solution is water or a polar organic solvent. Illustrative of suitable polar organic solvents of high dielectric constant are ketones, nitriles, amines, amides, alcohols, and esters in which the sodium iodide, lithium iodide, and alkaline earth iodides are soluble. Such organic solvents include acetamide, acetonitrile, propionitrile, acetone, furfural, hydrazine, methyl ethyl ketone, ethylene diamine, monoethanolamine, formic acid, ethyl acetate, and dimethylformamide. In general, those polar organic solvents of high dielectric constant and low molecular weight and which are readily commercially available as inexpensive solvents are preferred. Illustrative of such preferred solvents are acetonitrile and dimethylformamide. After reaction, the synthesized compositions are recovered from the reaction medium by precipitation, either by adding an additional component to reduce the solubility of the composition or by evaporating the solvent away.

DESCRIPTION OF THE PREFERRED EMBODIMENTS

In the practice of the process of the present invention in its preferred aspects, the appropriate amount of silver iodide is dissolved in the reaction medium, and the appropriate amount of the second iodide, or combination of iodides, is then added. For example, to form the composition $RbAg_4I_5$, the components are used in a ratio of 4AgI:RbI. In preparing the alkali metal silver iodides, the second iodide may be rubidium iodide, potassium iodide, ammonium iodide, cesium iodide, or combinations thereof. Cesium iodide where used constitutes less than 50 percent by weight of the second iodide, and is present only in combination with one or more of the other alkali metal iodides.

To prepare the organically substituted ammonium silver iodides, the organic ammonium iodide components and the molar ratios used are essentially as described in U. S. Pat. No. 3,476,606, particularly as set forth in Column 3 thereof. Thus n moles of AgI will be reacted with each mole of QI to give the organic ammonium silver iodide compound having the formula $QAg_nI_{n+1}$ where $n$ has any value between 3 and 39. Preferably, 4 to 9 molar portions of silver iodide are reacted with each molar portion of QI. For example, to prepare a preferred compound, 6½ moles of AgI are reacted with 1 mole of $NR_4I$, where R is preferably a lower alkyl group such as methyl, ethyl, propyl, or butyl.

The second iodide, MI or QI, may be added to the reaction medium as a solid or as an aqueous solution. It is preferable to add the second iodide as an aqueous solution or slurry when an organic solvent is used in the reaction medium. Acetonitrile and dimethylformamide have been found to be especially useful polar organic solvents.

The process may be carried out at any suitable temperature, for example, from slightly above room temperature to about 100°C. Preferably, the temperature is above 50°C. The synthesized compositions are easily recovered from the reaction medium.

Recovery from the reaction medium solution may conveniently and preferably be made in either of two ways. In the first method, the reaction medium solution is evaporated to dryness. After drying, a suitable solvent, e.g., a warm lower alkyl alcohol, such as ethanol or isopropyl alcohol, at a temperature of about 40°–60°C, is added to dissolve out the LiI, NaI, or alkaline earth metal iodide. Ethanol, for example, is preferable for use with LiI solutions, since LiI is more soluble in ethanol than in isopropyl alcohol. After removal of the alcohol, the remaining solid is dried, for example, by heating at a temperature of about 50°–150°C for 0.5 to 5 hours.

In another method, the synthesized ionically conductive composition may be separated as a solid from the reaction medium by extraction with an alcohol at room temperature or preferably slightly warmed, e.g., 40°–60°C. To the reaction medium containing the synthesized ionically conductive material, an approximately equal volume of warm lower alkyl alcohol is added. The mixture is stirred briefly and allowed to separate into layers. The upper alcohol layer contains a white solid; this alcohol layer is separated from the reaction medium, for example, by decanting and filtering the alcohol while warm or by other suitable methods. After removal of the alcohol, the residue, which is the solid ionically conductive composition, is dried, for example, by heating at 50°–150°C for about 0.5 to 5 hours. Ethanol and isopropyl alcohol are especially useful for extracting the ionically conductive composition in this second method. In using this method, care must be taken to avoid the use of excess amounts of alcohol since this may result in precipitation of small amounts of AgI from the reaction medium, thereby contaminating the ionically conductive composition. This method is especially useful for separating the compositions from a reaction medium containing NaI. It is possible, with the use of the organic solvents, that some of the solvent or NaI or LiI may be present with the final product.

With either of the methods described above, a purer product may be obtained by washing the precipitate with a dry lower alkyl alcohol. By such washing, any NaI or LiI or other alcohol-soluble compounds that may have coprecipitated with the ionically conductive composition, or any of the polar organic solvent still remaining with the composition, can more effectively be removed.

The present process is especially useful for preparing ionically conductive compositions for use in thin-film and single-crystal electrochemical devices. By suitable control of the conditions of precipitation and evaporation, thin films or large single crystals of the compositions may be produced in a relatively simple manner, since removal of the solvent by evaporation leaves the compound behind.

The following examples serve to illustrate the invention, but are in no way considered limiting thereto:

EXAMPLE 1

28.0 g. NaI was dissolved in 10 ml. water at 60°C. To this solution were added 26.0 g. AgI and 5.9 g. RbI. The solution was evaporated to dryness, and 5 ml. isopropyl alcohol at a temperature of 50°C was added to dissolve out the NaI. The remaining solid was then dried at 100°C for three-fourths hour. X-ray and conductivity tests showed that the solid was the ionically conductive composition $RbAg_4I_5$.

EXAMPLE 2

The process of Example 1 was followed, except that after reaction of the AgI and RbI in aqueous NaI reaction medium, and without evaporating to dryness, 10 ml. ethanol at 50°C was added to the reaction medium, and the mixture was stirred briefly. Upon standing for a minute, the mixture separated into two layers with the upper alcohol layer containing a white solid. The upper layer was decanted and filtered while warm, and the solid residue was dried at 100°C for one hour. X-ray analysis and conductivity tests showed the compound to be $RbAg_4I_5$.

EXAMPLE 3

$LiI \cdot 3H_2O$ was dissolved in water at 60°C in a ratio of 9.2 g. $LiI \cdot 3H_2O$ to 2 ml. water. To 5 ml. of this warm solution, 6.0 g. AgI and 1.35 g. RbI were added and dissolved. The resulting solution was evaporated to dryness, and the precipitate was washed with warm ethanol to dissolve out the LiI. The remaining solid was dried at 120°C for 0.5 hour and found to be mainly $RbAg_4I_5$, with trace amounts of LiI associated therewith.

EXAMPLE 4

A solution of 28.0 g. NaI in 10 ml. water at 60°C was prepared. 6.5 g. AgI and 1 g. $N(C_2H_5)_4I$ were dissolved in the solution. The reaction medium was evaporated to dryness, and the residue was washed with 10 ml. isopropyl alcohol at a temperature of 50°C to extract the NaI. The remaining solid was dried at 100°C for 0.5 hour. X-ray analysis and conductivity tests showed the solid to be $[N(C_2H_5)_4]_2Ag_{13}I_{15}$, which may also be written as $N(C_2H_5)_4Ag_{6.5}I_{7.5}$, or as $N(C_2H_5)_4I \cdot 6½AgI$.

EXAMPLE 5

1.0 g. NaI was dissolved in 5 ml. acetonitrile which had been warmed to a temperature of 85°C. 2.5 g. AgI was dissolved in the NaI-acetonitrile reaction medium, and to the resulting solution was added 0.7 g. RbI dissolved in 0.9 ml. water. The NaI solution containing RbI and AgI was evaporated to dryness, and the residue was washed with 6 ml. isopropyl alcohol which had been warmed to 50°C. The remaining residue was then dried at 100°C for three-fourths hour, and found by x-ray analysis to be about 90 percent $RbAg_4I_5$.

EXAMPLE 6

Example 5 was repeated, except that after preparation of the NaI-acetonitrile solution containing AgI and RbI, 6 ml. isopropyl alcohol at a temperature of 50°C was added to the solution, and the mixture was stirred briefly. The mixture was allowed to stand for 1 to 2 minutes and separated into layers, the upper layer containing a white solid. The upper layer was decanted and filtered while warm, and the solid residue was dried at 100°C for 1 hour. The residue was found to contain about 90 percent $RbAg_4I_5$, with small amounts of NaI and acetonitrile associated therewith.

EXAMPLE 7

3.0 g. NaI was dissolved in 5.0 ml. dimethylformamide which had been warmed to 95°C. 3.0 g. AgI was dissolved in the NaI solution, and 1.0 ml. water containing 0.75 g. RbI was then added. The resulting solution was evaporated to dryness, and NaI was washed out of the residue with warm isopropyl alcohol. The remaining solid was dried at 100°C for one hour and found by x-ray analysis to be about 95 percent $RbAg_4I_5$.

EXAMPLE 8

Example 1 was repeated except that 4.7 g. KI was used instead of the RbI. The resulting ionically conductive composition synthesized was $KAg_4I_5$.

EXAMPLE 9

Example 1 was repeated except that 4.0 g. $NH_4I$ was used instead of the RbI. The resulting ionically conductive composition synthesized was $NH_4Ag_4I_5$.

EXAMPLE 10

Example 1 was repeated except that 3.0 g. CsI and 2.9 g. RbI were used instead of RbI alone. The resulting ionically conductive composition was found to be $Rb_{1/2}Cs_{1/24}I_5$.

Compounds made according to the process of this invention are prepared combining stoichiometric proportions corresponding to 4AgI:MI or nAgI:QI, e.g., $RbAg_4I_5$ or $6½AgI:N(C_2H_5)_4I$. However, small amounts of the starting compounds or of adventitious impurities which may be present will not unduly decrease the ionic conductivity values. Further, certain inorganic compounds such as silica as well as organic polymers and other additives may be included with the pure compounds for purposes of moisture absorption, stability, etc.

It will of course be realized that various modifications can be made in the design and operation of the present invention without departing from the spirit thereof. Thus, while the principle, preferred construction, and mode of operation of the invention have been explained and what is now considered to represent its best embodiment has been illustrated and described, it should be understood that within the scope of the appended claims the invention may be practiced otherwise than as specifically illustrated and described.

I claim:
1. A process for preparing a solid ionically conductive composition of matter of the general formula:
  1. $MAg_4I_5$ where M is Rb, K, $NH_4$, Cs, or combinations thereof, Cs being present only in combination as a minor constituent of M; or
  2. $QAg_nI_{n+1}$, where n has a value from 3 to 39 inclusive and Q is an organic ammonium cation having an ionic volume between 30 and 85 cubic angstroms; which process comprises the steps of (a) preparing a reaction medium which is a solution of a compound selected from the group consisting of sodium iodide, lithium iodide and the alkaline earth iodides in a solvent selected from the group consisting of water and polar organic solvents, (b) dissolving AgI in said reaction medium (c) adding at least a second iodide compound selected from MI and QI to the reaction medium containing AgI, the second iodide compound and AgI being added to the reaction medium in about stoichiometric amounts, corresponding to the ionically conductive composition prepared, and (d) separating the so-prepared solid ionically conductive composition of matter from the reaction medium.

2. The process according to claim 1 wherein the second iodide compound is added in the form of a solid to the reaction medium containing AgI.

3. The process according to claim 1 wherein the second iodide compound is added in the form of an aqueous solution to the reaction medium containing AgI.

4. The process according to claim 1 wherein the temperature of the reaction medium is between about 50° and 100°C.

5. The process according to claim 1 wherein said polar organic solvent is selected from acetonitrile and dimethylformamaide.

6. The process according to claim 1 wherein step (d) comprises evaporating the reaction medium to dryness, extracting the compound selected from the group consisting of sodium iodide, lithium iodide, and an alkaline earth iodide with a lower alkyl alcohol, and drying the remaining solid ionically conductive composition to thereby separate the ionically conductive composition from the reaction medium.

7. The process according to claim 6 wherein the lower alkyl alcohol is at a temperature above 50°C.

8. The process according to claim 6 wherein the lower alkyl alcohol is selected from ethanol and isopropyl alcohol.

9. The process according to claim 6 wherein the reaction medium contains lithium iodide and wherein the lower alkyl alcohol is ethanol.

10. The process according to claim 1 wherein the reaction medium of step (a) contains NaI and wherein step (d) comprises adding a volume of lower alkyl alcohol of approximately equal volume to the reaction mixture, stirring, separating an alcohol layer containing the ionically conductive composition, and evaporating the alcohol layer to dryness to thereby separate the ionically conductive composition from the reaction medium.

11. The process according to claim 1 wherein M is Rb and the formed solid ionically conductive composition is $RbAg_4I_5$.

12. The process according to claim 1 wherein an organic ammonium silver iodide composition is prepared by reacting from 4 to 9 moles of AgI with each mole of $NR_4I$ where R represents at least one lower alkyl group selected from methyl, ethyl, propyl, and butyl.

* * * * *

PO-1050
(5/69)

UNITED STATES PATENT OFFICE
CERTIFICATE OF CORRECTION

Patent No. 3,719,609     Dated  March 6, 1973

Inventor(s) Leo E. Topol

It is certified that error appears in the above-identified patent and that said Letters Patent are hereby corrected as shown below:

Cover page under References Cited, "Follerth" should read --Folberth--.
Column 1, line 78, "3,433,997" should read --3,443,997--.
Column 5, line 31, "$Rb_{1/2}Cs_{1/24}I_5$" should read --$Rb_{1/2}Cs_{1/2}Ag_4I_5$--.

Signed and sealed this 12th day of March 1974.

SEAL)
Attest:

EDWARD M. FLETCHER, JR.
Attesting Officer

C. MARSHALL DANN
Commissioner of Patents